2,624,411

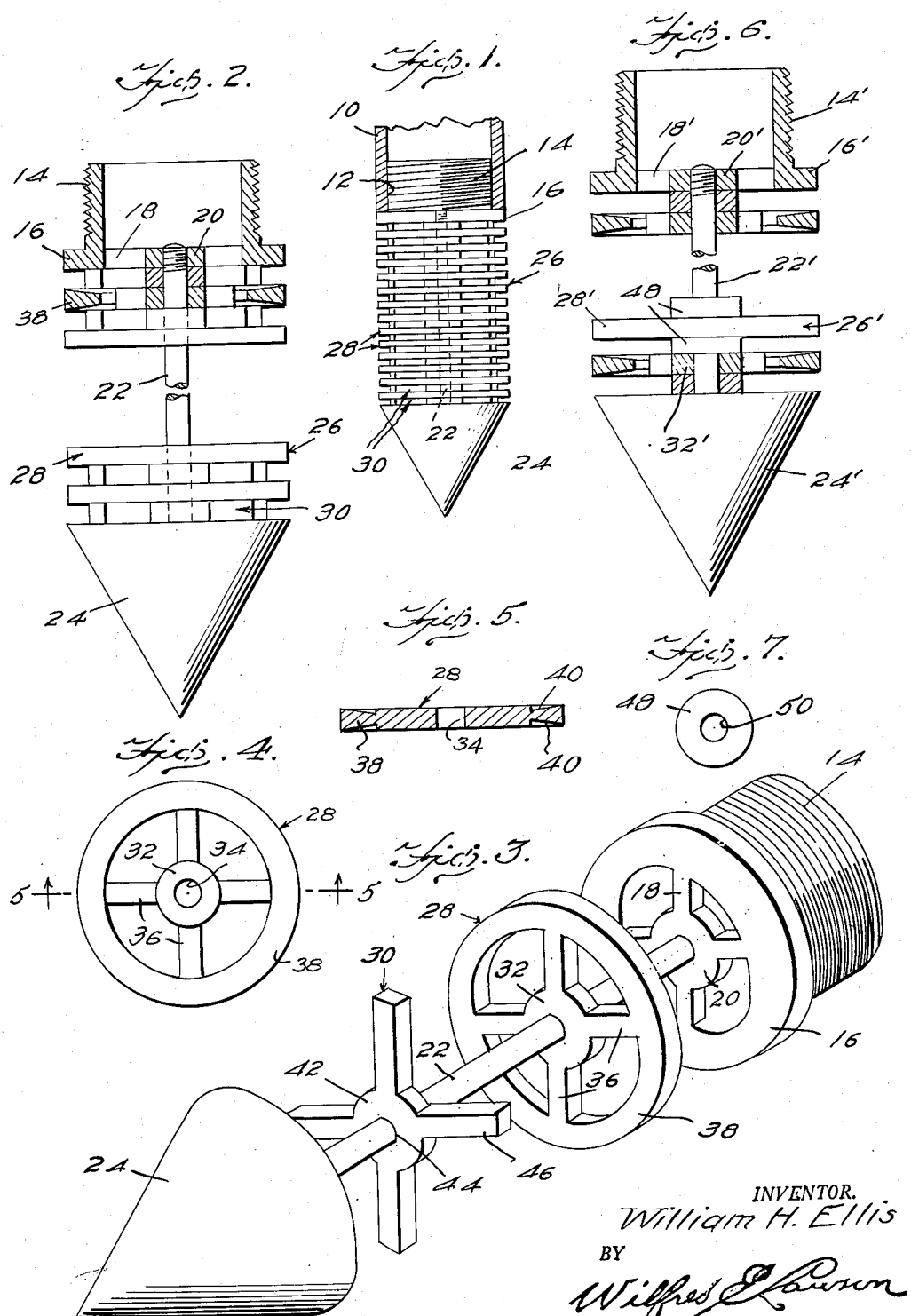
Jan. 6, 1953 — W. H. ELLIS — 2,624,411
WELL STRAINER
Filed Aug. 7, 1950
INVENTOR.
William H. Ellis
BY Wilfred J. Lauer
ATTORNEY Patented Jan. 6, 1953

UNITED STATES PATENT OFFICE 2,624,411

WELL STRAINER

William H. Ellis, Lovelaceville, Ky.

Application August 7, 1950, Serial No. 178,057

2 Claims. (Cl. 166—5)

This invention relates to a strainer and more particularly to a strainer for use in the bottom of a well.

The primary object of the invention is to prevent the entrance of dirt, grit, and like foreign substance into a well pipe and at the same time assure freedom of flow of the fluid in the well into the pipe.

Another object is to enable the strainer to be so constructed that it may arrest movement of fine particles of grit or the like while passing the fluid without impairing the free flow thereof.

Among its features the invention embodies a stack of spaced filter plates having passages extending therethrough so that fluid entering the filter between the filter plates may flow through said passages into a well pipe.

Other features include a nipple adapted to be attached to the lower end of a well pipe from which are suspended a stack of spaced filter plates having passages therein which communicate with the passage through the nipple, and a pilot suspended from the nipple and forming a stop against which the lower end of the stack of filter plates engages.

Still other features include constructing the strainer so that a larger or smaller number of spaced filter plates may be employed according to the capacity of the well in which the strainer is used.

Still further features include inclining the upper and lower faces of the rims of the filter plates to facilitate the passage of fluid between spaced plates.

In the drawings:

Figure 1 is a fragmentary view partially in section of a well pipe equipped with this improved well strainer, Figure 2 is a fragmentary enlarged view partly in section of one embodiment of well strainer constructed in accordance with this invention, Figure 3 is a perspective view of the tie rod and pilot showing a spacer and filter disk partially assembled thereon, Figure 4 is a plan view of a filter disk embodying the features of this invention, Figure 5 is a transverse sectional view taken substantially along the line 5—5 of Figure 4, Figure 6 is a view similar to Figure 2 illustrating a modified embodiment of the invention, and Figure 7 is a plan view of a spacer of the type employed in the strainer illustrated in Figure 6.

Referring to the drawings in detail a well pipe 10 is provided adjacent its lower ends with internal screw threads 12 into which an externally screw threaded nipple 14 is threadedly entered. This nipple 14 is provided adjacent its lower end with an outstanding annular flange 16 and inwardly extending radial arms 18 which support within said nipple 14 adjacent its lower end an internally screw threaded hub 20. A suspension or tie rod 22 is threadedly engaged at one end with the threads of the hub 20, and carried by the opposite end of the tie rod 22 and extending longitudinally therefrom is a conical pilot 24 which serves as a stop against which the stack designated generally 26 of spaced filter plates is seated.

The stack 26 is formed of filter plates designated generally 28 and spacers designated generally 30. Each filter plate 28 comprises a hub portion 32 having an axial opening 34 extending therethrough and carried by said hub portion 32 are radial arms 36 which support in concentric spaced relation with the hub 32 a rim 38. In the preferred form of the invention the rim 38 is provided with top and bottom converging side walls 40 which are so disposed that the rim diminishes in thickness as it approaches the hub 32.

Each spacer 30 comprises a hub 42 having an axial opening 44 therein and carrying outwardly extending radial arms 46 which are of a length substantially equal to the length of the arms 36 of the filter plate 28 plus the rim 38 thereof.

In constructing the strainer illustrated in Figures 1, 2 and 3, the filter plates 28 are threaded onto the tie rod 22 by passing the tie rod through the openings 34 in the filter plates and between adjacent filter plates a spacer 30 is disposed with the tie rod 22 extending through the opening 44 of the hub 42 thereof. After so disposing the filter plates 28 and spacers 30 on the tie rod 22 in the form of a stack 26, the threaded end of the tie rod remote from the pilot 24 is threadedly engaged in the threaded opening in the hub of the nipple 14 and by turning the nipple 14 to advance it toward the pilot 24 it will be evident that the stack 26 of spaced filter plates 28 will be clamped between the pilot 24 and the flange 16 of the nipple 14. Obviously by increasing or decreasing the length of the tie rod 22 and using more or less of the filter plates 28 and spacers 30, the capacity of the strainer produced may be varied to suit the requirements. Moreover it is obvious that by using spacers 30 of varying thicknesses, the ability of the strainer to arrest the flow of solids may be varied to suit the requirements and owing to the sloping or inclined faces 40, it is evident that a free flow of fluid through the strainer may be achieved.

In the modified form of the invention illustrated in Figures 6 and 7, a nipple 14' is equipped with external screw threads for engagement with a well pipe and is provided adjacent its lower end with an outstanding annular flange 16' as well as inwardly extending radial arms 18' which support a hub 20' having an internally screw threaded opening for the reception of the threaded end of a tie rod 22' which carries at its end remote from the threaded end a longitudinally extending conical pilot 24'. In this structure the stack designated generally 25' is composed of filter plates 28' which correspond in all respects to the filter plates 28 previously referred to. Contrary to the structure previously described however the filter plates 28' are separated by spacers 48 which constitute disks having axial openings 50 extending therethrough for the reception of the tie rod 22'. These disks 48 are preferably of a diameter substantially equal to the diameter of the hubs 32' of the filter plates 28'.

In the preferred form of the invention, the stack 26 or 26' are provided at opposite ends with spacers and spacers are arranged between the filter plates 28 and 28' so that when the device is lowered into a well, fluid will flow between the filter plates and into and through the passages formed between the radiating arms 36 and 46 or between the radiating arms 36 of the filter plates 28' and around the spacers 48 so as to enter the nipple 14 or the nipple 14' through the openings formed between the arms 18 and 18' thereof. Obviously by increasing the length of the tie rod 22 or 22', and placing additional filter plates and spacers thereon the capacity of the filter may be increased. Obviously where a relatively small capacity strainer is required a relatively short tie rod is employed and relatively few filter plates and spacers are used. In this way strainers of varying capacities may be easily constructed to meet varying requirements. In the preferred form of the invention, the diameter of the pilot 24 or 24' as the case may be is equal substantially to the diameter of the flange 16 or 16' and the filter plate 28 or 28' so that the device presents a substantially cylindrical form between the upper end of the pilot and the lower end of the nipple which is of a diameter substantially equal to the external diameter of the well pipe 10 upon which the device is used. In this way the strainer may be easily introduced into a well or extracted therefrom as there are no external obstructions on the well pipe which will interfere with its movements in a well hole.

While in the foregoing there has been shown and described the preferred form of this invention, it is to be understood that minor changes in the details of construction, combination and arrangement of parts may be resorted to without departing from the spirit and scope of the invention as claimed.

I claim:

1. A strainer comprising a stack of filter plates and spacers between the filter plates; each filter plate comprising a hub having an axial opening extending therethrough, arms radiating from said hub and a rim carried by the arms in concentric spaced relation to the hub; each spacer comprising a hub and arms radiating from said hub for engaging the rim of an adjacent filter plate; an elongate tie rod extending through the axial openings of said hubs, a conical pilot carried by and having the tie rod secured in and extending longitudinally from the center of the base thereof, said pilot forming a stop against the base of which one end of the stack of filter plates and spacers bears, a nipple threaded on the tie rod remote from the pilot, and said nipple having a passage extending therethrough which communicates with the spaces between the arms of the filter plates and the spaces between the arms of the spacers.

2. The invention according to claim 1, wherein said nipple is defined at one end by an outwardly projecting surrounding flange, a hub in the center of the nipple and arms radiating from said hub to and joining the wall of the nipple in the plane of the flange.

WILLIAM H. ELLIS.

REFERENCES CITED

The following references are of record in the file of this patent:

UNITED STATES PATENTS

| Number | Name | Date |
|---|---|---|
| 304,617 | Cook | Sept. 2, 1884 |
| 420,553 | Dickerson | Feb. 4, 1890 |
| 657,102 | Guy | Sept. 4, 1900 |
| 990,861 | Hamill | May 2, 1911 |
| 1,641,485 | Heftler | Sept. 6, 1927 |
| 1,976,217 | Diepenbrock | Oct. 6, 1934 |
| 2,084,185 | Boyer | June 15, 1937 |